Aug. 30, 1960     D. C. MADDUX     2,950,606
DISPENSING MECHANISM AND AIR CIRCULATION SYSTEM THEREFOR
Filed June 6, 1958     2 Sheets-Sheet 1

INVENTOR.
DUANE C. MADDUX
BY R. E. Geauque
Attorney

Aug. 30, 1960 D. C. MADDUX 2,950,606
DISPENSING MECHANISM AND AIR CIRCULATION SYSTEM THEREFOR
Filed June 6, 1958 2 Sheets-Sheet 2
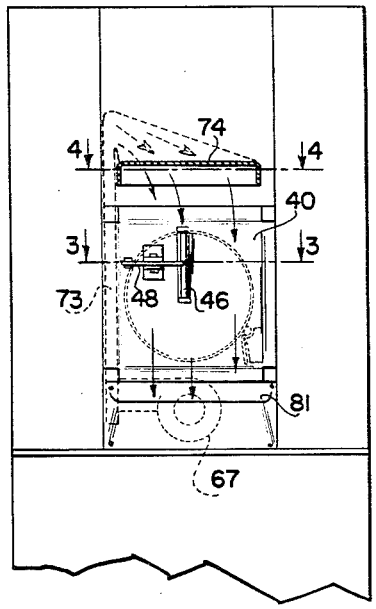
Fig. 2
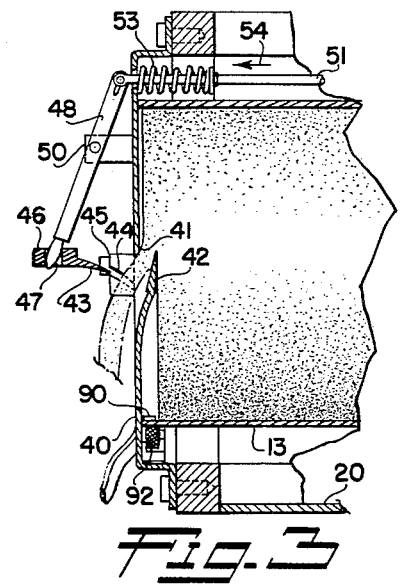
Fig. 3
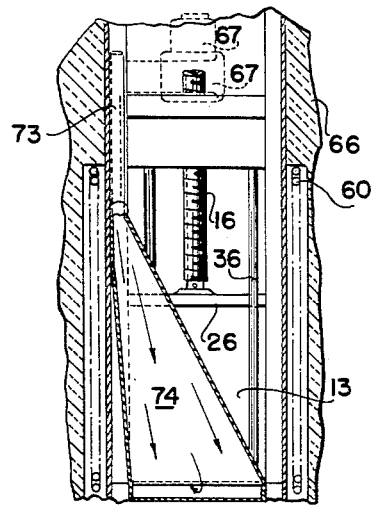
Fig. 4
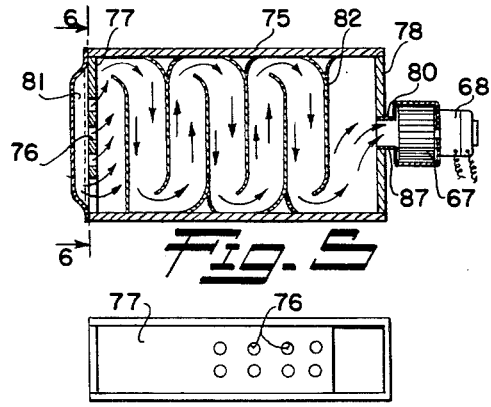
Fig. 5
Fig. 6
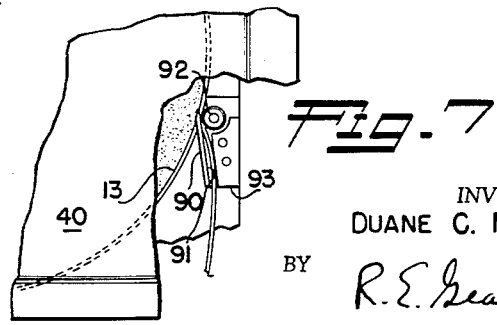
Fig. 7
INVENTOR.
DUANE C. MADDUX
BY
R. E. Geauque
Attorney

United States Patent Office 2,950,606
Patented Aug. 30, 1960

2,950,606

DISPENSING MECHANISM AND AIR CIRCULATION SYSTEM THEREFOR

Duane C. Maddux, 3016 W. Verdugo, Burbank, Calif.

Filed June 6, 1958, Ser. No. 740,239

3 Claims. (Cl. 62—320)

This invention relates to a dispensing mechanism and air circulation system therefor and more particularly to a machine for dispensing semi-frozen materials, such as ice cream, sherbet or other frozen desserts. A general object is to provide a machine that will dispense the contents of a standard cylindrical paper carton of ice cream or sherbet employing a cutting means for separating the material from the carton which maintains the material in a semi-solid or frozen state.

The practice of packing bulk ice cream or sherbet in 2½ and 5 gallon cylindrical paper cartons has been almost universally adopted by the ice cream manufacturers. The cartons are refrigerated and the ice cream or sherbet therein becomes very hard. Usually, the cartons arrive in their hardened condition at the soda fountain or other retail establishment where the materials within the cartons are dispensed. A common method of dispensing the contents of such a carton is to place the carton in a well of a refrigerated dispensing cabinet and to dip the contents from the carton with an ice cream scoop. When the ice cream or sherbet is in its extremely cold, hardened condition, it is extremely difficult to remove it with a scoop. To overcome this disadvantage, a dispensing machine such as shown and described in U.S. Letters Patent 2,534,782 was devised which provides a machine for dispensing the contents of a carton of ice cream or sherbet directly into a dish or suitable container. More specifically, it is an object of this prior invention to provide a machine for dispensing the contents of a paper ice cream carton through a nozzle, outlet or cutter means into a receiving member such as a dish. To this end, the prior invention provides for continuously maintaining the body of ice cream or sherbet in contact with the nozzle or outlet, and peels away the carton as the ice cream is dispensed.

Difficulties are encountered when employing a dispensing means as shown in the prior referenced dispensing machine which stem largely from the fact that the ice cream or sherbet being dispensed from the nozzle or outlet is subjected to the ambient temperature of the dispensing machine's environment so that the semi-hardened ice cream or sherbet rapidly melts. This condition causes the nozzle or outlet to eventually be covered with an accumulation of soft and sometimes liquid ice cream. Obviously, in order to keep the nozzle or outlet sanitary, frequent cleaning of the outlet is required and in most instances, all of the ice cream waste cannot be removed leaving an unsightly and unsanitary condition to exist.

This difficulty is obviated in accordance with the present invention wherein a cold air circulation system is provided which causes a cold air circulation flow to pass over the face of the nozzle or outlet for the dispensing machine while the dispensing operation is in process. This cold air circulation insures that the ice cream being dispensed maintains its desired temperature causing it to remain in its semi-solid state. The system of the present invention provides a squirrel cage type blower for moving the air flow about the carton containing the ice cream and over the face of the carton, including the dispensing outlet or nozzle and through a de-moisturizing unit and back into the squirrel cage blower for re-circulation. A feature resides in the present invention which permits the de-moisturizing unit to be readily inspected and removed when excess ice or frost accumulation has collected on the elements thereof.

Therefore, it is a primary object of the present invention to provide a cold air circulating system which includes a path for the cold air over the front face of the dispensing outlet to cool the surrounding parts and the semi-solid materials being dispensed.

It is another object of the present invention to construct a dispensing machine having a bracket arrangement internally for supporting a carton of semi-solid material at an angle with respect to the vertical axis of the machine so that the material being dispensed may drop downward without interference with the front of the dispensing unit. By placing a cutting blade at the top of the dispensing unit and vertical respective to its face, the dispensed material will follow a natural dropping path from the top or upper portion of the dispensing unit downward into a receiving dish or container.

It is another object of the present invention to construct a machine for dispensing frozen or semi-frozen material from a carton which is moved toward a cutting blade for achieving dispensation by a power unit wherein the carton is substantially enclosed by insulating material to maintain the material in its frozen or semi-frozen state. A feature resides in the fact that an insulation barrier is provided between the carton and the power unit.

It is another object of the present invention to employ a cold air circulation system to isolate the dispensing nozzle, outlet or cutting means of the machine from the ambient temperature external of the machine.

Still a further object of the present invention is to provide a removable de-moisturizing unit which is readily accessible from the dispensing side of the machine so that a new unit free from frost and ice may be easily and rapidly inserted into the re-circulation system.

Another object of the present invention is to provide an air circulation system which is cooled inductively by refrigeration coils whose primary function is to maintain the material in the carton in a semi-frozen state.

Still another object of the present invention is to provide a path of cool air over the base of the dispensing outlet or nozzle to maintain the material in its semi-frozen condition regardless of the environmental or ambient temperature in which the dispensing machine is employed.

Another object is to provide a means for keeping the dispensing portion of the machine free from excess material or an accumulation of waste which, after a time, would have a tendency to become extremely soft and perhaps even liquid. This undesirable condition would require expensive maintenance and a constant vigilance for sanitary reasons.

These and other objects will be more readily described and understood with reference to the accompanying drawings wherein:

Figure 2 is a front view of the dispensing machine of Figure 1 taken in the direction of arrows 2—2;

Figure 3 is an enlarged fragmentary sectional view of the dispensing outlet and cutter means of the machine of Figure 1 taken in the direction of arrows 3—3 of Figure 2;

Figure 4 is an enlarged sectional view of a portion of the ducting of the air circulation system taken in the direction of arrows 4—4 of Figure 2;

Figure 5 is a sectional view of the de-moisturizing unit showing air flow through its baffling taken in the direction of arrows 5—5 of Figure 1;

Figure 6 is a front view of the de-moisturizing unit taken in the direction of arrows 6—6 of Figure 5; and Figure 7 is an enlarged view of a carton stripping means for separating the carton strip from the material.

Figure 1:
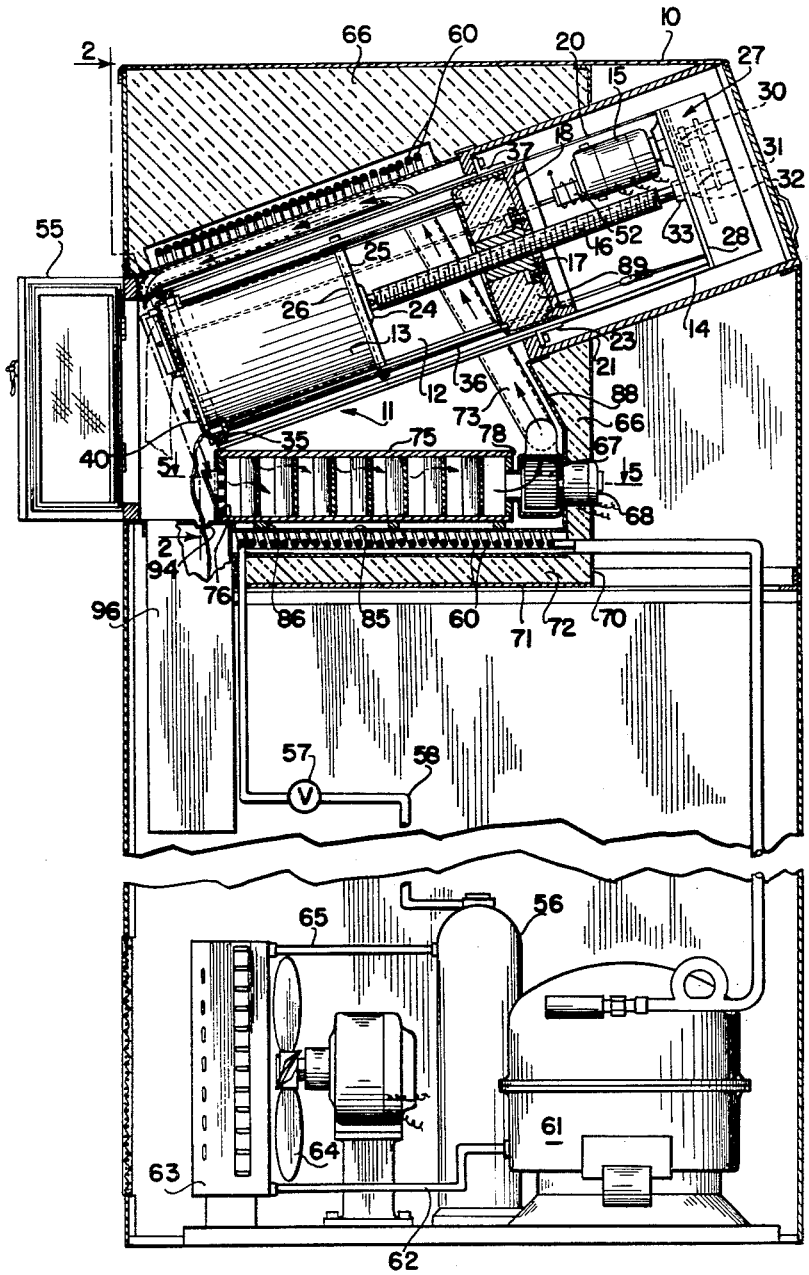
Figure 1 is a sectional view of an ice cream dispensing machine showing the cool air circulation system in accordance with the present invention.

As an example of one form in which the invention may be embodied, there is shown in Figure 1 a dispensing machine comprising a cabinet 10 inclosing a dispensing unit 11 which includes a lower chamber 12 to receive a standard cylindrical ice cream carton 13 and an upper chamber 14 in which is mounted actuating mechanism for rotating the carton and simultaneously feeding it downwardly. The actuating mechanism includes a motor 15 and a lead screw 16 which operates in an internally threaded collar 17 carried by a bracket 18 secured to a housing 20. The housing encloses chamber 12 and is supported on a mounting 21 by means of an annular bracket 23.

The lower end of the lead screw 16 is secured to a fixture 24 which carries a circular seat 25 upon which the carton 13 is received. A flange 26 on the periphery of the seat receives the side wall of the carton 13 with a snug friction fit, and downward pressure of the seat against the carton tends to expand the lower end of the carton sufficiently to maintain a tight wedging fit between the carton and the flange for transmitting drive between the seat and the carton.

The motor drives a gear reduction train 27 which is mounted on a bracket 28 carried on the housing 20. The motor is also mounted on a bracket 28. The gear reduction train 27 drives a pinion 30 which meshes with a gear 31. The gear has a hub 32 through which extends a squared shaft 33 constituting a continuation of the feed screw 16. The hub has a squared bore fitting the shaft so as to transmit rotatory drive thereto while permitting the shaft to slide vertically therein.

The end of the housing opposite to its end enclosing the actuating mechanism, is provided with an annular ring 35 which supports a plurality of spaced rods 36 connected between the ring and a fixture 37 supported on bracket 18. The purpose of these rods is to provide a guiding path for the carton and the seat into which the carton is disposed. The front of housing 20 is provided with a front piece 40 the inner side of which comes into contact with the ice cream in the carton. The ice cream is pressed against this inner side by means of actuating mechanism.

It is to be noted that the actuating mechanism 27, carton 13, housing 20 supporting the mechanism and carton, and mounting 21 supporting the housing all form, in general, a dispensing unit which may be readily removed from the cabinet for repair or carton replacement purposes. To remove, the dispensing unit is simply pulled upward and outward from the rear of the cabinet 10. Thereby, a feature resides in the fact that the dispensing unit is portable so that its removal is readily achieved and accessibility into the cabinet greatly enhanced for servicing.

As shown more clearly in Figures 2 and 3, the front piece 40 is provided with a vertical outlet slot 41 which includes a vertical knife edge 42 extending along the length of the slot which is offset from the outer surface of the front piece so that it cuts into the material as the carton 13 is rotated by the actuating mechanism. The knife edge is bevelled in a fashion which directs the path of severed ice cream through the slot. A second knife edge 43 is provided which serves to cut into the ice cream when a predetermined amount of ice cream has been dispensed via slot 41. Knife edge 43 is guided by means of an aperture 44 located in a block 45 fixed to the outer surface of front piece 40 adjacent the outlet slot. The knife edge is provided with a thickened portion 46 having an aperture 47 which receives one end of a lever 48 which is pivotally mounted on a fulcrum 50 secured to the front face 40. The end of the lever 48 opposite to its end carrying the knife edge 43 is loosely attached to one end of an actuating rod 51 which has its opposite end inserted into a core of a solenoid operated relay 52, as shown in Figure 1. Rod 51 is biased by means of spring 53 to maintain knife edge 43 out of the outlet slot 41 to permit the passage of ice cream. However, upon actuation of solenoid 52, the rod 51 is moved in the direction of arrow 54 which causes lever 48 to pivot about fulcrum 50 which, in turn, causes knife edge 43 to sever the material and causes the closure of slot 41. A door 55 is hinged to the cabinet and is remained closed until such time as it is desirable to dispense ice cream.

To maintain the ice cream contained in carton 13 in its semi-frozen condition, it has been found desirable to provide a refrigerating system for cooling the surrounding area in which the carton is placed. This function is achieved in the dispensing machine of Figure 1 by employing a conventional vapor compression refrigeration system which comprises, in general, a storage tank 56 which holds a refrigerant liquid at about atmospheric temperature, an expansion valve 57 connected to the tank via a line 58 which receives the liquid and passes it on to the low-pressure region of the cycle, and an evaporator 60 composed of many turns or coils of piping for the absorption of energy as heat by the low pressure liquid from the region surrounding the ice cream carton 13. A compressor 61 is connected to the evaporator for withdrawing the evaporated liquid at a rate sufficient to maintain the necessary reduced pressure and temperature. The compressor also functions to compress the liquid into a vapor or gas to gain an increase in temperature and pressure. Upon leaving the compressor via line 62, the vapor enters a condenser 63 where it is cooled by a fan 64 and passed on to the tank 56 via a line 65 as a cooled liquid. The coils 60 are arranged about the area wherein the ice cream carton is placed so as to maintain this area in a cold environment. Disposed about the coil turns 60 there is provided sufficient insulating material 66 to insure that the area containing the ice cream will be maintained in a maximum area of cold temperature.

In accordance with the present invention, an air circulating system is provided within the cabinet 10 of the dispensing machine of Figure 1 which may be said to comprise a squirrel cage blower 67 actuated by a motor 68 which is suitably mounted on an upright bracket 70 having a portion 71 formed at a right angle to project parallel to the lower portion of the plurality of coils 60. The lower portion serves to support a lower portion 72 of insulation material 66. The outlet for the air blown by the blower 67 is connected to a tubular duct 73 which projects upward about housing 20 and then at a substantial right angle thereto in a direction parallel with the upper plurality of coils 60 over the top portion of the housing and ice cream container 13. The end of the duct opposite to its end connected to the blower forms a flat fanned out duct portion 74, as shown in Figure 4, and is directed downward over the front piece 40 so that the air supplied to the ducts 73 and 74 by means of the blower is directed across the outer surface of the front piece 40 and in particular across the outlet slot 41 including the knife edges 42 and 43.

The air circulating system includes a de-moisturizing unit 75 which is provided with a plurality of holes 76 in one end 77 thereof which communicates the interior of the unit with the air flow expelled from the ducts over the front piece 40. An end 78 opposite to end 77 is provided with an opening 80 attached to the center portion of the blower so that the air within the de-moisturizing unit is drawn therethrough into the blower. To increase the efficiency of the de-moisturizing unit's ability to catch the air expelled from the ducts, end 77 is provided externally with a vent 81 opening upward to receive the downward expulsion of air from the ducts.

As shown in Figure 5, the interior of the de-moisturizing unit is provided with a plurality of baffles 82 which are arranged to provide a zig-zag path for the air flow from end 77 of the unit to its opposite end 78 at the blower. The de-moisturizing unit is employed for collecting moisture in the form of ice and frost on its plurality of bafflings so that ice accummulations are minimized throughout the entire air circulating system. The de-moisturizing unit is supported on bracket 85 by a plurality of spacers 86 and the unit is readily removable from its connection with the input to the blower by a press fit connection 87. To remove the de-moisturizing unit, it is only necessary to open the door 55 and slide the unit out on bracket 85 through the opening provided by the open door.

It is to be noted that bracket 85 is formed with a substantially upright portion 88 and that bracket 70—71 cooperates with bracket 85—88 to hold the insulating material. Furthermore, bracket portion 70 and 88 serve to support the mounting 21 so that the ice cream carton is angularly disposed relative to the cabinet 10. A feature resides in this arrangement since the ice cream being dispensed will have a tendency to fall away from the front piece 40 so that severance of the ice cream by knife 43 is all that is required to separate the ice cream from the dispenser. This arrangement also provides convenience since a dish or other article may be placed directly beneath the outlet slot to receive dispensed ice cream without interference with the front piece 40.

Between fixture 37 and bracket 18, there is provided a block 89 of insulating material which is similar to material 66 and 72 and serves to define the area to be refrigerated in cooperation with the other insulating material arrangements. To insure that the block 89 is properly lined up with the insulation material 66 and 72 and to properly position the front piece for dispensing the semi-solid material through the outlet slot, bracket 23 is fixed to the housing 20 at a location arranged to be secured to mounting 21 so that the dispensing unit is properly placed. Since the one end of the mounting defines a portion of the area to be maintained in a cool condition, it has been found desirable to locate the bracket 23 in close proximity to block 89.

As shown in Figure 4, the upper duct is provided with a flared portion 74 which distributes the air from the tubular portion 73 past the front piece so that the entire outer surface of the front piece 40 is covered by the stream of expelled air from the flared portion of the duct.

With reference to Figure 7, a stripping means is provided for cutting a portion of the carton away after the desired amount of ice cream has been severed by knife 42 and passed through outlet slot 41. This means comprises a cutter and guide blade 90 which intercepts the travel of the portion of the carton to be cut and a guide path 91 for the severed portion defined by the guide blade 90 and a roller 92 and a block 93 disposed beneath the roller. As shown in Figure 1, the severed portion of the carton is directed by the stripper means past an aperture 94 into a receptacle 96. Accumulation of stripped carton portions may be readily disposed at the convenience of the dispensing machine operator.

Actual operation is achieved by energizing the motor 15 and as long as the motor runs, the carton 13 will be rotated and advanced along guide rod 36 so that the exposed ice cream in carton 13 will be cut by knife edge 42 and forced downward through outlet slot 41. The ribbon of the carton wall will be peeled from the ice cream by stripping means 90 and fed downward through the opening 94.

To sever the dispensed ice cream, solenoid operated relay 52 is actuated which causes rod 51 to move in the direction of arrow 54. The movement of rod 51 pivots lever 48 on fulcrum 50 so that knife edge 43 travels toward the front piece 40 to sever the portion of ice cream passing through outlet 41. It has been found desirable to employ a button and timing mechanism (not shown) to control motor 15 which operates the solenoid relay 52 after the motor stops to sever the dispensed ice cream.

In accordance with the present invention, the outer surface of front piece 40 and the ice cream being dispensed via outlet 41 is maintained in a cooled or semi-frozen state by means of a cool air circulation system. This system is situated within the evaporation coils of a conventional refrigerating system and thereby the air employed by the air circulating system is maintained at a cool temperature. Starting with a blower 67, air is forced through a tubular duct 73 which widens to form a flared portion 74 and expels the forced air downward across the outer surface of the front piece 40, including the dispensing outlet 41.

The stream of expelled air from the flared duct 74 enters the de-moisturizing unit 75 via the vent 81 and the plurality of holes 76. The air is drawn through the de-moisturizer past a zig-zag path of baffles 82 by the suction generated by the blower 67.

Should frost or ice accumulate on the baffles of the de-moisturizing unit, it is necessary only to remove the frosted de-moisturizing unit 75 and replace it with another unit free from such accumulation.

Thereby, it can be seen from the foregoing description that the dispensing machine of the present invention can dispense ice cream or other semi-frozen material from a carton so that the dispensed material is maintained in its semi-frozen condition by passing a stream of cold air over the outlet through which the material must pass. It is also seen that the cold air stream is provided within the evaporating means of a conventional refrigerating system and that a constant re-circulation of the air is obtained.

Having described only a typical form of the present invention, I do not wish to be limited to the specific details herein set forth, but wish to reserve to myself any variation or modifications that may appear to those skilled in the art and fall within the scope of the following claims.

What is claimed is:

1. In an apparatus for dispensing a semi-solid material from a cylindrical paper carton, the combination which comprises, a cabinet, a housing mounted in the cabinet supporting the carton at an angle relative to the vertical axis of the cabinet, a front piece mounted on the housing having an outlet slot and a cutting edge projecting into the material, actuating mechanism attached to the housing and engageable with the carton for imparting rotary movement thereto, the rotary movement removing material from the carton by the cutting edge via the outlet slot, a cool air source mounted in the cabinet adjacent the housing, a duct connected to the air source for receiving an air supply from the source and arranged to expel the cool air across the outlet slot to maintain the material in its semi-solid condition, de-moisturizing means connecting the expelled air to the air source, and stripping means carried on the front piece engageable with a portion of the carton for severing the portion from the main body of the carton.

2. In an apparatus for dispensing a semi-solid material from a cylindrical paper carton, the combination which comprises, a cabinet, a housing mounted in the cabinet supporting the carton at an angle relative to the vertical axis of the cabinet, a front piece mounted on the housing having an outlet slot and a cutting edge projecting into the material, the outlet slot and cutting edge vertically formed in the front piece so that dispensed material drops from the slot in an elongated arcuate path, actuating mechanism attached to the housing and engageable with the carton for imparting rotary movement thereto, the rotary movement removing material from the carton by the cutting edge via the outlet slot, a cool air source mounted in the cabinet adjacent the housing, a duct connected to the air source for receiving an air supply from the source and arranged to expel the cool air across the vertically disposed outlet slot to maintain the material in its semi-solid condition, demoisturizing means connecting the expelled air to the air source, and stripping means carried on the front piece engageable with a portion of the carton for severing the portion from the main body of the carton.

3. The invention as defined in claim 2 including, means carried within the cabinet below the front piece cooperating with the stripping means to receive the severed portion of the carton.

References Cited in the file of this patent

UNITED STATES PATENTS

| | | |
|---|---|---|
| 1,970,492 | Crankshaw | Aug. 14, 1934 |
| 2,322,882 | Raskin | June 29, 1943 |
| 2,534,782 | Maddux | Dec. 19, 1950 |
| 2,608,833 | Woodruff | Sept. 2, 1952 |
| 2,710,508 | Staebler et al. | June 14, 1958 |
| 2,814,998 | Maddux | Dec. 3, 1957 |
| 2,896,421 | Rader | July 28, 1959 |